(12) United States Patent
Tokumasu et al.

(10) Patent No.: US 8,008,829 B2
(45) Date of Patent: Aug. 30, 2011

(54) ARMATURE FOR A ROTATING ELECTRICAL MACHINE

(75) Inventors: Tadashi Tokumasu, Tokyo (JP); Masafumi Fujita, Yokohama (JP); Takashi Ueda, Yokohama (JP); Mikio Kakiuchi, Yokohama (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 200 days.

(21) Appl. No.: 12/362,090

(22) Filed: Jan. 29, 2009

(65) Prior Publication Data

US 2009/0195105 A1    Aug. 6, 2009

(30) Foreign Application Priority Data

Jan. 31, 2008  (JP) ................... 2008-020942

(51) Int. Cl.
*H02K 3/28* (2006.01)
(52) U.S. Cl. ............ 310/198; 310/202; 310/206
(58) Field of Classification Search .......... 310/203, 310/206, 207, 195, 198, 202, 179, 180
See application file for complete search history.

(56) References Cited

U.S. PATENT DOCUMENTS

| | | | |
|---|---|---|---|
| 2,015,562 A | 9/1935 | Kilgore | |
| 2,630,541 A * | 3/1953 | McElligott et al. | ........... 310/198 |
| 2,778,962 A | 1/1957 | Taylor | |
| 2,778,963 A | 1/1957 | Habermann | |
| 3,408,517 A * | 10/1968 | Willyoung | ........ 310/198 |
| 4,404,486 A * | 9/1983 | Keim et al. | ........ 310/198 |
| 6,388,357 B1 | 5/2002 | Tokumasu | |
| 6,570,290 B2 * | 5/2003 | Kazmierczak | ........ 310/184 |
| 2007/0152520 A1 * | 7/2007 | Takahashi et al. | ........ 310/65 |
| 2007/0182267 A1 | 8/2007 | Neet | |
| 2009/0096312 A1 * | 4/2009 | Tokumasu et al. | ........ 310/198 |

FOREIGN PATENT DOCUMENTS

| | | |
|---|---|---|
| GB | 518135 | 2/1940 |
| JP | 2007-269462 A | 10/2007 |

OTHER PUBLICATIONS

Communication and European Search Report mailed Jul. 31, 2009, in corresponding European Application No. 09151109.7.

* cited by examiner

*Primary Examiner* — Quyen Leung
*Assistant Examiner* — Eric Johnson
(74) *Attorney, Agent, or Firm* — Christensen O'Connor Johnson Kindness PLLC

(57) ABSTRACT

In an armature, the upper and lower coil pieces in one half of the parallel circuits are located at the 1st, 4th, 6th, 7th, 9th, 12th and 14th positions, and the upper and lower coil pieces in remaining half of the parallel circuits are located at the 2nd, 3rd, 5th, 8th, 10th, 11th and 13th positions, when relative positions of the upper and lower coil pieces in each phase belt are indicated by positions counted in a direction separating away from a pole center.

14 Claims, 7 Drawing Sheets

US 8,008,829 B2

ARMATURE FOR A ROTATING ELECTRICAL MACHINE

CROSS-REFERENCE TO RELATED APPLICATIONS

This application is based upon and claims the benefit of priority from prior Japanese Patent Application No. 2008-020942, filed Jan. 31, 2008, the entire contents of which are incorporated herein by reference.

BACKGROUND OF THE INVENTION

1. Field of the Invention

The present invention relates to an armature having an armature winding with four parallel circuits, which is applied to a rotating electrical machine having 84 three-phase two-pole slots.

2. Description of the Related Art

In a large-capacity rotating electrical machine, an armature winding is provided in two layers in slots with upper coil pieces and lower coil pieces provided in a laminated core, and the two layers of armature winding are connected in series to provide a high voltage, thereby increasing an apparatus capacity. However, as an armature winding rises in voltage, the thickness of a main insulator of the armature winding needs to be increased to withstand the voltage. As a result, the cross-sectional area of a conductor of the armature winding is decreased. This increases a current density and loss.

Particularly, in a machine adopting indirect cooling system for cooling an armature winding from the outside of a main insulator, a thick main insulator increases thermal resistance and temperature of an armature winding. Therefore, an armature winding is divided into two or more parallel circuits to decrease in voltage and main insulator thickness, while keeping an apparatus capacity, thereby increasing a cooling capacity with decreased loss. Particularly, in an indirect cooling large-capacity machine, it is common to increase the number of slots to increase the peripheral length of an armature winding to be cooled. Therefore, it is necessary to use an armature winding having three or more parallel circuits.

However, if a two-pole machine adopts an armature winding with three or more parallel circuits, it is impossible to generate the same voltage in parallel circuits. Therefore, a circulating current occurs generated among the parallel circuits, and increases loss in the armature winding.

To decrease the loss caused by the circulating current, it is necessary to minimize the imbalance among the voltages generated in the parallel circuits. It is thus necessary to give special consideration to arrangement of coil pieces in each parallel circuit in each phase belt.

A phase belt mentioned here means a winding part, which forms the same phase by dividing each of three phases into a plurality of parts, housing upper and lower coil pieces in two layers into slots provided in an assigned armature core, and sequentially connecting them in series.

An explanation will be given of an example of improvement in arrangement of coil pieces by referring to a developed perspective view showing an armature winding in FIG. 7, showing a part for one phase. FIG. 7 is a developed perspective view showing one phase of an example of an armature winding having four parallel circuits applicable to a rotating electrical machine having 72 three-phase two-pole slots, based on U.S. Pat. No. 2,778,962 (hereinafter, called a Taylor patent).

FIG. 7 shows a part for only one phase. It is however appreciated that parts for the other two phases are obtained by displacing the configuration of the armature winding of FIG. 7 by 120° and 240° (electric angle), respectively, and an illustration thereof is omitted.

As shown in FIG. 7, an armature 11 comprises an armature core 12, and an armature winding 14 housed in slots 13 provided in the armature core 12.

In the armature winding 14, when parallel circuits housed in the slots 13 are indicated by parenthetic numbers 1, 2, 3 and 4, twelve upper coil pieces 15a and lower coil pieces 16a, forming a first phase belt 17, are numbered 1, 2, 2, 1, 2, 1, 1, 2, 1, 2, 2 and 1 sequentially from a pole center Pa, and twelve upper coil pieces 15b and lower coil pieces 16b, forming a second phase belt 18, are numbered 3, 4, 4, 3, 4, 3, 3, 4, 3, 4, 4 and 3 sequentially from a pole center Pb, thereby decreasing a voltage deviation (an absolute value of deviation from an average phase voltage) in the parallel circuits and a phase difference deviation circuits (a phase angle deviation from an average phase voltage) in the parallel circuits.

To realize the above connection, in the armature winding 14 of FIG. 7, coil ends 19a on the connection side are connected by fourteen jumper wires 20a, coil ends 19b on the counter-connection side are directly connected, and lead-out ends of corresponding parallel circuits are connected between the first and second phase belts 17 and 18, by connection conductors 21.

As an example concerning the deviation of voltage and phase angle in parallel circuits, there is a U.S. Pat. No. 2,778,963 (hereinafter, called a Habermann patent). This patent indicates that a reference value of voltage deviation is 0.4% or lower, and a reference value of phase angle deviation is 0.15° or lower. However, in the Taylor patent mentioned above, the voltage deviation is 0.12% and the phase angle deviation is 0° in the parallel circuits, which are highly balanced compared with the above reference values, and sufficiently effective in decreasing a circulating current.

In the connection method disclosed in the Taylor patent, the deviation of voltage generated in each parallel circuit is reduced to small, and this method is suitable from an electrical viewpoint, but its application is limited to a rotating electrical machine having 72 three-phase two-pole slots.

An armature winding having four parallel circuits is mechanically complex. Namely, as shown in FIG. 7, for making an armature winding, it is necessary to provide fourteen jumper wires 20a per phase at the connection-side coil end 19a, for connecting upper coil pieces 15 and lower coil pieces 16. Connection of the jumper wires 20a requires much time and labor, and it is important to ensure the insulation and fixing strength of the jumper wires 20a.

There are twenty locations per phase for connecting the upper and lower coil pieces 15 and 16, except a location to connect a lead-out connection conductor 21, at the connection-side coil end 19a. At fourteen locations per phase among these twenty locations, the connection side jumper wires 20a are connected in a short distance, the jumper wire connection work is uneasy, and it is difficult to ensure the insulation and fixing strength of the jumper wire, due to the interference between the jumper wires 20a, and between the jumper wires 20a and lead-out connection conductors 21.

BRIEF SUMMARY OF THE INVENTION

Accordingly, it is an object of the present invention to provide an armature having an armature winding with four parallel circuits, applied to a rotating electrical machine having 84 three-phase two-pole slots, in which a voltage imbalance among parallel circuits is decreased, and a circulating current loss among parallel circuits is decreased, and a jumper wire connection work for forming an armature winding is decreased, insulation and fixing strength of jumper wires are easily ensured.

According to one aspect of the present invention, there is provided an armature comprising: an armature core with slots; and an armature winding that is housed in the slots, wound in two layers, and provided with fourteen coil pieces per pole and phase, each phase of the armature winding divided into two phase belts per pole, each phase belt having two parallel circuits, each parallel circuit having a serial coil, each serial coil having upper coil pieces and lower coil pieces connected to each other at a connection-side coil end and a counter-connection side coil end, the upper and lower coil pieces in one half of the parallel circuits being located at the 1st, 4th, 6th, 7th, 9th, 12th and 14th positions, and the upper and lower coil pieces in remaining half of the parallel circuits being located at the 2nd, 3rd, 5th, 8th, 10th, 11th and 13th positions, when relative positions of the upper and lower coil pieces in each phase belt are indicated by positions counted in a direction separating away from a pole center.

DETAILED DESCRIPTION OF THE INVENTION

Hereinafter, embodiments of an armature winding of a rotating electrical machine according to the present invention will be explained with reference to the accompanying drawings. The same parts in drawing are denoted by the same reference numbers, and a description thereof will be omitted.

First Embodiment

Figure 1:
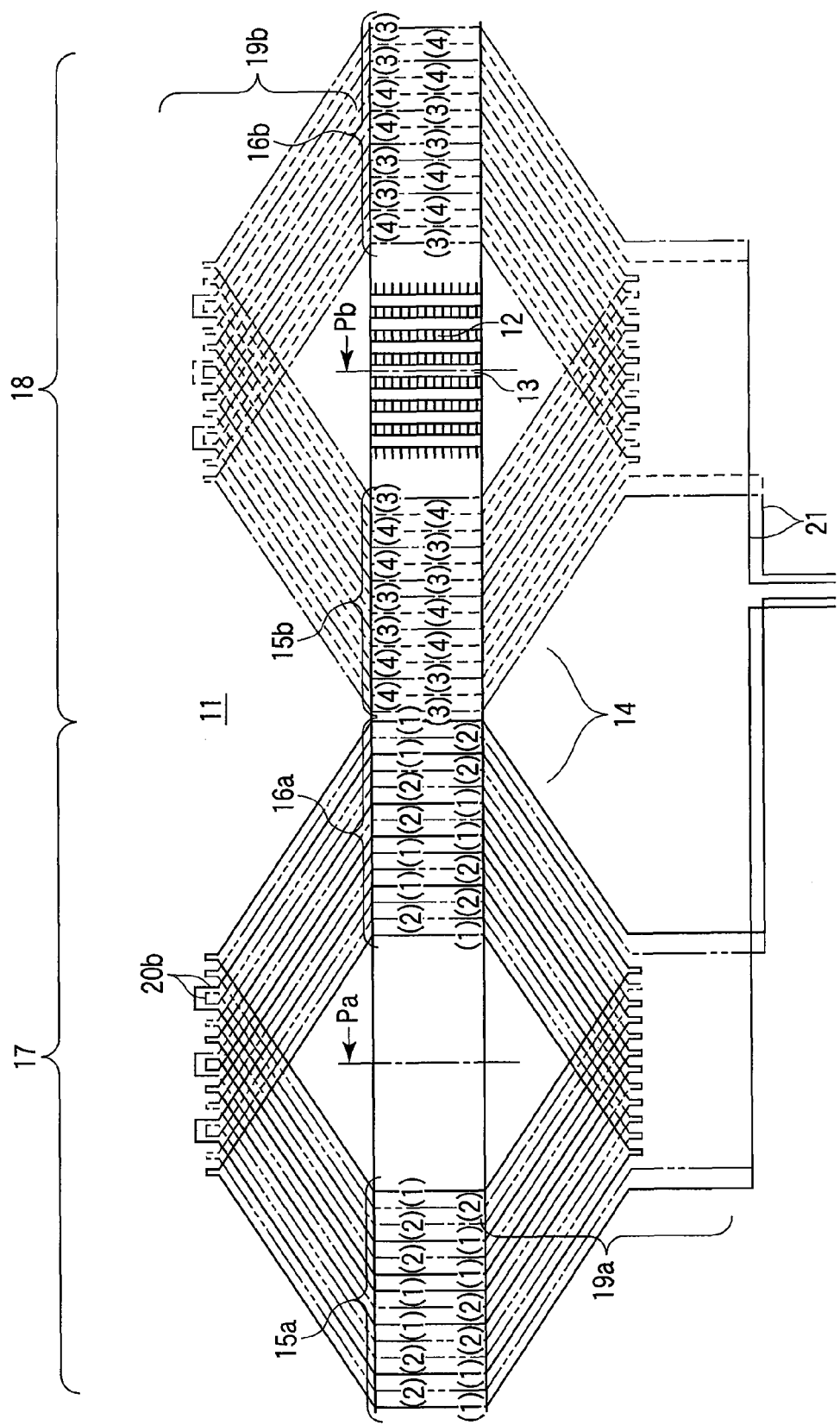
FIG. 1 is a developed perspective view showing one phase of an armature winding of a rotating electrical machine according to a first embodiment of the present invention.

FIG. 1 is a developed perspective view showing one phase of an armature winding of a rotating electrical machine according to a first embodiment of the present invention.

An armature 11 has 84 slots 13 in an armature core 12 consisting of a laminated core. A two-pole three-phase armature winding 14 having four parallel circuits is provided in two layers in the slots 13.

The armature winding 14 of each phase has upper coil pieces 15 (15a, 15b) housed in the upper part of the slots 13, and lower coil pieces 16 (16a, 16b) housed in the lower part of the slots 13. The end portions of these upper and lower coil pieces 15 and 16 are connected in series at a connection-side coil end 19a, and at a counter-connection side coil end 19b that is opposite to the connection-side coil end in the axial direction and not connected to a winding lead-out portion.

The armature winding 14 also has a first phase belt 17 which houses the upper and lower coil pieces 15a and 16a in fourteen slots 13 provided in the armature core 12, and a second phase belt 18 which houses the upper and lower coil pieces 15b and 16b in fourteen slots 13.

The armature winding 14 of each phase has four parallel circuits. The parallel circuits are identified by parenthetic numbers 1, 2, 3 and 4 as shown in the drawing.

The circuit numbers are merely signs to identify the circuits. Any signs may be assigned to the circuits in any order.

The upper coil pieces 15 in each of the phase belts 17 and 18 are connected to the corresponding lower coil pieces 16 separated by a fixed coil pitch, at the connection-side coil end 19a and counter-connection side coil end 19b, thereby forming four parallel circuits 1, 2, 3 and 4. The parallel circuits 1, 2, 3 and 4 are connected in parallel through the lead-out conductor 21 provided at the connection-side coil end 19a, thereby forming the armature winding 14. FIG. 1 shows an example adopting a small coil pitch of ⅔. This is just for making the drawing easy to see. A coil pitch is not limited to this value.

In FIG. 1, by providing six jumper wires 20a per phase belt at the counter-connection side coil end 19b of each of the phase belts 17 and 18, when the relative positions of the upper and lower coil pieces 15 and 16 in the phase belts 17 and 18 are indicated by the positions from a pole center Pa (Pb), the positions of the upper and lower coil pieces 15 and 16 in each parallel circuit are as shown in Table 1. Seven upper and lower coil pieces 15 and 16 in each of the first and third parallel circuits are located at the 1st, 4th, 6th, 7th, 9th, 12th and 14th positions from a pole center Pa (Pb), and seven upper and lower coil pieces 15 and 16 in each of the second and fourth parallel circuits are located at the 2nd, 3rd, 5th, 8th, 10th, 11th and 13th positions from a pole center Pa (Pb).

TABLE 1

Arrangement of upper and lower coils in first embodiment

| | | Relative positions from a pole center | | | | | | |
|---|---|---|---|---|---|---|---|---|
| | | 1 | 2 | 3 | 4 | 5 | 6 | 7 |
| Parallel circuits 1 and 3 | Upper coil piece | 1 | | | 1 | | 1 | 1 |
| | Lower coil piece | 1 | | | 1 | | 1 | 1 |
| Parallel circuits 2 and 4 | Upper coil piece | | 1 | 1 | | 1 | | |
| | Lower coil piece | | 1 | 1 | | 1 | | |

| | | Relative positions from a pole center | | | | | | |
|---|---|---|---|---|---|---|---|---|
| | | 8 | 9 | 10 | 11 | 12 | 13 | 14 |
| Parallel circuits 1 and 3 | Upper coil piece | | 1 | | | 1 | | 1 |
| | Lower coil piece | | 1 | | | 1 | | 1 |
| Parallel circuits 2 and 4 | Upper coil piece | 1 | | 1 | 1 | | 1 | |
| | Lower coil piece | 1 | | 1 | 1 | | 1 | |

Therefore, the circuits of the upper and lower coil pieces 15a and 16a in the first phase belt 17 are numbered 1, 2, 2, 1, 2, 1, 1, 2, 1, 2, 2, 1, 2 and 1 sequentially from a pole center Pa, and the circuits of the upper and lower coil pieces 15b and 16b in the second phase belt 18 are numbered 3, 4, 4, 3, 4, 3, 3, 4, 3, 4, 4, 3, 4 and 3 sequentially from a pole center Pb.

Next, an explanation will be given on the imbalance among the voltages generated in one phase. As a means for evaluating the imbalance as a numeric value, the following definition is usually adopted. Namely, the p. u. indication of the voltage in only one of the parallel circuits in one phase is a ratio between an open-circuit voltage of that parallel circuit and an average voltage (a phase voltage) of the whole phase. This indicates the degree of imbalance between the open-circuit voltage of that parallel circuit and whole phase voltage. Similarly, a phase angle deviation in an open-circuit voltage and a phase voltage generated in one parallel circuit indicates the degree of imbalance between the phase angles of that parallel circuit and whole phase.

Table 2 shows the balance among the voltages generated in the armature winding according to the first embodiment of the invention.

However, as the balance varies with a coil pitch in this embodiment, Table 2 shows the case where a coil pitch is 35/42 (83.33%). As shown in Table 2, in the armature winding according to the first embodiment of the invention, a voltage deviation (deviation from 1.0 of the p. u. voltage) is 0.18% maximum, and a phase angle deviation is 0.0°, which are a little lower than the imbalance in the Taylor patent, but satisfy the reference voltage deviation of 0.4% and reference phase angle deviation of 0.15° or lower in the Habermann patent.

TABLE 2

Voltage balance in first embodiment

| | Parallel circuit | | | |
|---|---|---|---|---|
| | 1 | 2 | 3 | 4 |
| Value of voltage (p.u.) | 0.9982 | 1.0018 | 0.9982 | 1.0018 |
| Phase of voltage (degrees) | 0.000 | 0.000 | 0.000 | 0.000 |

Table 3 shows the maximum values of voltage deviation and phase angle deviation changed by a coil pitch in the first embodiment of the invention. The balance within a practical coil pitch range satisfies the reference voltage deviation of 0.4% and reference phase angle deviation of 0.15° or lower in the Habermann patent.

TABLE 3

Relationship between coil pitch and imbalance voltage in first embodiment

| | Coil pitch | | | | | |
|---|---|---|---|---|---|---|
| | 33/42 | 34/42 | 35/42 | 36/42 | 37/42 | 38/42 |
| Deviation in voltage value | 0.14% | 0.16% | 0.18% | 0.20% | 0.22% | 0.24% |
| Deviation in phase angle | 0.0° | 0.0° | 0.0° | 0.0° | 0.0° | 0.0° |

As described above, in the first embodiment of the invention, as the balance equivalent to the value in the Taylor patent can be realized with respect to the voltages in parallel circuits, and satisfy the reference value in the Habermann patent, a circulating current can be decreased.

Further, the total number of jumper wires 20b is decreased from twelve per phase in the first embodiment of the invention. As the jumper wires 20b are provided at the counter-connection side coil end 19b, and not causing interference with the lead-out conductor 21. This improves the workability of connecting the jumper wires 20b, ensures the insulation and fixing strength of the connection part without difficulty, and provides a reliable armature winding.

The embodiment is not limited to the configuration shown in the drawing. The same effect can be obtained also by changing the lead-out position, and replacing the coil pieces placed at the electrically equivalent positions in the parallel circuits 1 and 3.

Second Embodiment

Figure 2:
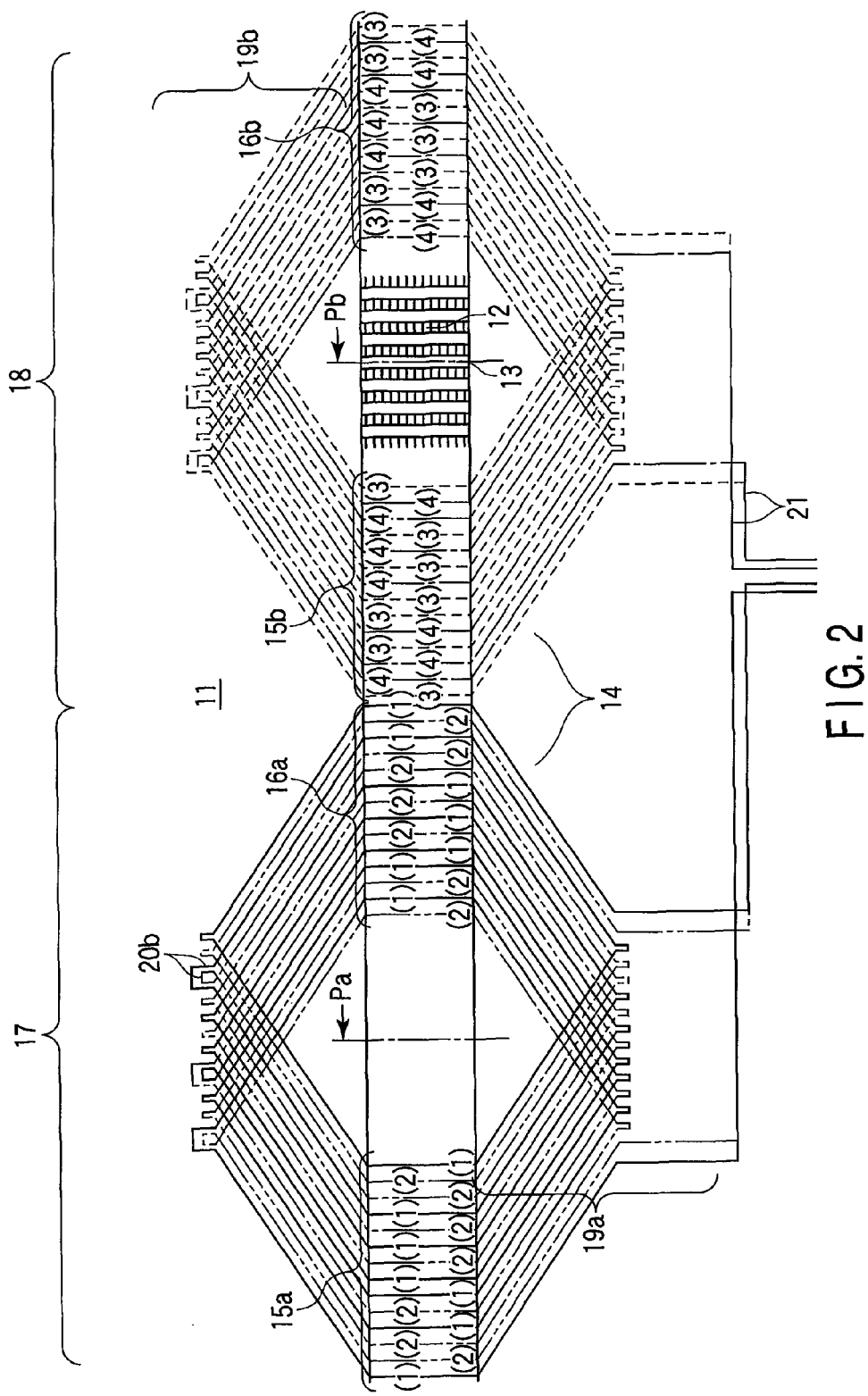
FIG. 2 is a developed perspective view showing one phase of an armature winding of a rotating electrical machine according to a second embodiment of the invention.

FIG. 2 is a developed perspective view showing one phase of an armature winding of a rotating electrical machine according to a second embodiment of the invention.

An armature 11 has 84 slots 13 in an armature core 12 consisting of a laminated core. A two-pole three-phase armature winding 14 having four parallel circuits is provided in two layers in the slots 13.

The armature winding 14 of each phase has upper coil pieces 15 (15a, 15b) housed in the upper part of the slots 13, and lower coil pieces 16 (16a, 16b) housed in the lower part of the slots 13. The end portions of these upper and lower coil pieces 15 and 16 are connected in series at a connection-side coil end 19a that is connected to a winding lead-out portion, and at a counter-connection side coil end 19b that is opposite to the connection side coil end in the axial direction and not connected to a winding lead-out portion.

The armature winding 14 also has a first phase belt 17 which houses the upper and lower coil pieces 15a and 16a in fourteen slots 13 provided in the armature core 12, and a second phase belt 18 which houses the upper and lower coil pieces 15b and 16b in the fourteen slots 13.

The armature winding 14 of each phase has four parallel circuits. The parallel circuits are identified by parenthetic numbers 1, 2, 3 and 4 as shown in the drawing.

The upper coil pieces 15 in each of the phase belts 17 and 18 are connected to the corresponding lower coil pieces 16 separated by a fixed coil pitch, at the connection-side coil end 19a and counter-connection side coil end 19b, thereby forming four parallel circuits 1, 2, 3 and 4. The parallel circuits 1, 2, 3 and 4 are connected in parallel through the lead-out conductor 21 provided at the connection-side coil end 19a, forming the armature winding 14.

In FIG. 2, by providing six jumper wires 20b per phase belt at the counter-connection side coil end 19b of each of the phase belts 17 and 18, when the relative positions of the upper and lower coil pieces 15 and 16 in the phase belts 17 and 18 are indicated by the positions from a pole center, the positions of the upper and lower coil pieces 15 and 16 in each parallel circuit are as shown in Table 4. Seven upper coil pieces 15a and 15b in each of the first and third parallel circuits are located at the 1st, 4th, 6th, 8th, 9th, 11th and 14th positions from a pole center Pa (Pb), and seven lower coil pieces 16a and 16b in each of the first and third parallel circuits are located at the 2nd, 4th, 5th, 7th, 9th, 12th and 14th positions from a pole center Pa (Pb). Seven upper coil pieces 15 in each of the second and fourth parallel circuits are located at the 2nd, 3rd, 5th, 7th, 10th, 12th and 13th positions from a pole center Pa (Pb), and the lower coil pieces 16 are located at the 1st, 3rd, 6th, 8th, 10th, 11th and 13th positions from a pole center Pa (Pb).

TABLE 4

Arrangement of upper and lower coils in second embodiment

|  |  | Relative positions from a pole center | | | | | | |
|---|---|---|---|---|---|---|---|---|
|  |  | 1 | 2 | 3 | 4 | 5 | 6 | 7 |
| Parallel circuit 1 and 3 | Upper coil piece | 1 |  |  | 1 |  | 1 |  |
|  | Lower coil piece |  | 1 |  | 1 | 1 |  | 1 |
| Parallel circuit 2 and 4 | Upper coil piece |  | 1 | 1 |  | 1 |  | 1 |
|  | Lower coil piece | 1 |  | 1 |  |  | 1 |  |

|  |  | Relative positions from a pole center | | | | | | |
|---|---|---|---|---|---|---|---|---|
|  |  | 8 | 9 | 10 | 11 | 12 | 13 | 14 |
| Parallel circuit 1 and 3 | Upper coil piece | 1 | 1 |  | 1 |  |  | 1 |
|  | Lower coil piece |  | 1 |  |  | 1 |  | 1 |
| Parallel circuit 2 and 4 | Upper coil piece |  |  | 1 |  | 1 | 1 |  |
|  | Lower coil piece | 1 |  | 1 | 1 |  |  | 1 |

Therefore, the circuits of the upper coil pieces 15*a* in the first phase belt 17 are numbered 1, 2, 2, 1, 2, 1, 2, 1, 1, 2, 1, 2, 2 and 1 sequentially from a pole center Pa, and the circuits of the lower coil pieces 16*a* are numbered 2, 1, 2, 1, 1, 2, 1, 2, 1, 2, 2, 1, 2 and 1 sequentially from a pole center Pa. The circuits of the upper coil pieces 15*b* in the second phase belt 18 are numbered 3, 4, 4, 3, 4, 3, 4, 3, 3, 4, 3, 4, 4 and 3 sequentially from a pole center Pb and the circuits of the lower coil pieces 16*b* are numbered 4, 3, 4, 3, 3, 4, 3, 4, 3, 4, 4, 3, 4 and 3 sequentially from a pole center Pb.

Table 5 shows the balance among the voltages generated in the armature winding according to the second embodiment of the invention.

The balance varies with a coil pitch in this embodiment. Table 5 shows the case that a coil pitch is 35/42 (83.33%). As shown in Table 5, in the armature according to the second embodiment of the invention, a voltage deviation (deviation from 1.0 of the p. u. voltage) is 0.14% maximum, and a phase angle deviation is 0.04°, which are lower than the values in the Taylor patent, but satisfy the reference voltage deviation of 0.4% and reference phase angle deviation of 0.15° or lower in the Habermann patent.

TABLE 5

Voltage balance in second embodiment

|  | Parallel circuit | | | |
|---|---|---|---|---|
|  | 1 | 2 | 3 | 4 |
| Value of voltage (p.u.) | 1.0014 | 0.9986 | 1.0014 | 0.9986 |
| Phase of voltage (degrees) | −0.0415 | 0.0415 | −0.0415 | 0.0415 |

Table 6 shows the maximum values of voltage deviation and phase angle deviation changed by a coil pitch in the second embodiment of the invention. The balance within a practical coil pitch range satisfies the reference voltage deviation of 0.4% and reference phase angle deviation of 0.15° or lower in the Habermann patent.

TABLE 6

Relationship between coil pitch and imbalance voltage in second embodiment

|  | Coil pitch | | | | | |
|---|---|---|---|---|---|---|
|  | 33/42 | 34/42 | 35/42 | 36/42 | 37/42 | 38/42 |
| Deviation in voltage value | 0.18% | 0.16% | 0.14% | 0.12% | 0.10% | 0.08% |
| Deviation in Phase angle | 0.04° | 0.04° | 0.04° | 0.04° | 0.04° | 0.04° |

As described above, in the second embodiment of the invention, as the balance satisfying the value in the Taylor patent can be realized with respect to the voltages in parallel circuits, and a circulating current can be decreased.

Further, in the second embodiment of the invention, the jumper wires 20*b* are provided only on the counter-connection side as in the first embodiment, and do not interfere with the lead-out conductor 21. This improves the workability of connecting the jumper wires 20*b*, ensures the insulation and fixing strength of the connection part without difficulty, and provides a reliable armature winding, as in the first embodiment.

The embodiment is not limited to the configuration shown in the drawing. The same effect can be obtained also by changing the lead-out position, and replacing the coil pieces placed at the electrically equivalent positions in the parallel circuits 1 and 3.

Third Embodiment

Figure 3:
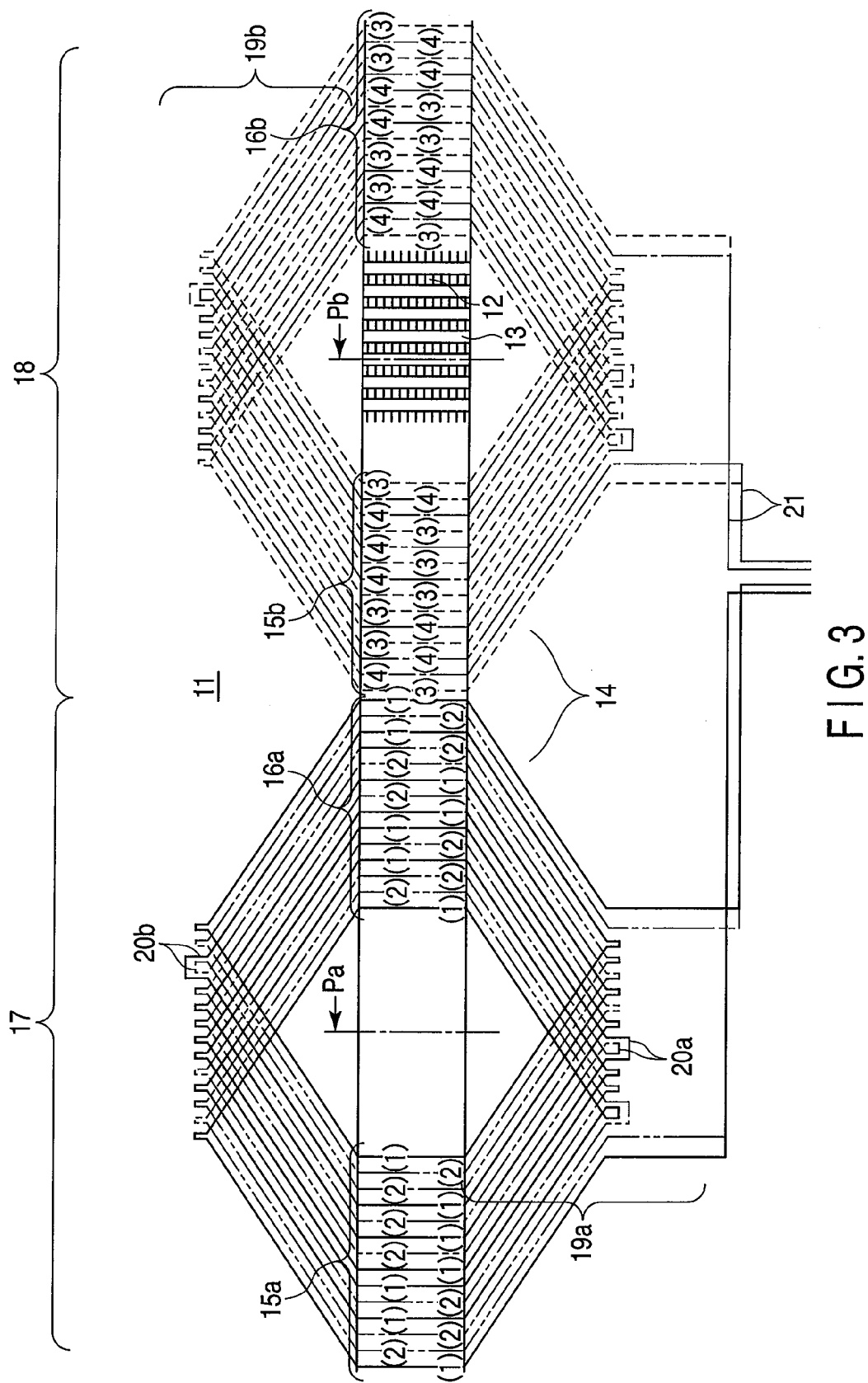
FIG. 3 is a developed perspective view showing one phase of an armature winding of a rotating electrical machine according to a third embodiment of the invention.

FIG. 3 is a developed perspective view showing one phase of an armature winding of a rotating electrical machine according to a third embodiment of the invention.

An armature 11 has 84 slots 13 in an armature core 12 consisting of a laminated core. A two-pole three-phase armature winding 14 having four parallel circuits is housed in two layers in the slots 13.

The armature winding 14 of each phase has upper coil pieces 15 (15*a*, 15*b*) housed in the upper part of the slots 13, and lower coil pieces 16 (16*a*, 16*b*) housed in the lower part of the slots 13. The end portions of these upper and lower coil pieces 15 and 16 are connected in series at a connection-side coil end 19*a* that is connected to a winding lead-out portion, and at a counter-connection side coil end 19*b* that is opposite to the connection-side coil end in the axial direction and not connected to a winding lead-out portion.

The armature winding 14 also has a first phase belt 17 which houses the upper and lower coil pieces 15*a* and 16*a* in fourteen slots 13 provided in the armature core 12, and a second phase belt 18 which houses the upper and lower coil pieces 15*b* and 16*b* in fourteen slots 13.

The armature winding 14 of each phase has four parallel circuits. The parallel circuits are identified by parenthetic numbers 1, 2, 3 and 4 as shown in the drawing.

The upper coil pieces 15 in each of the phase belts 17 and 18 are connected to the corresponding lower coil pieces 16 separated by a fixed coil pitch, at the connection-side coil end 19*a* and counter-connection side coil end 19*b*, thereby forming four parallel circuits 1, 2, 3 and 4. The parallel circuits 1, 2, 3 and 4 are connected in parallel through the lead-out conductor 21 provided at the connection-side coil end 19*a*, forming the armature winding 14.

In FIG. 3, by providing four jumper wires 20*a* per phase belt at the connection-side coil end 19*a* of each of the phase belts 17 and 18, and providing two jumper wires 20*b* per phase belt at the counter-connection side coil end 19b of each of the phase belts 17 and 18, when the relative positions of the upper and lower coil pieces 15 and 16 in the phase belts are indicated by the positions from a pole center Pa (Pb), the positions of the upper and lower coil pieces 15 and 16 in each parallel circuit are as shown in Table 7. Seven upper coil pieces 15a and 15b in each of the first and third parallel circuits are located at the 1st, 4th, 6th, 8th, 9th, 11th and 14th positions from a pole center Pa (Pb), and the lower coil pieces 16a and 16b are located at the 1st, 4th, 6th, 7th, 9th, 12th and 14th positions from a pole center Pa (Pb). Seven upper coil pieces 15a and 15b in each of the second and fourth parallel circuits are located at the 2nd, 3rd, 5th, 7th, 10th, 12th and 13th positions from a pole center Pa (Pb), and the lower coil pieces 16a and 16b are located at the 2nd, 3rd, 5th, 8th, 10th, 11th and 13th positions from a pole center Pa (Pb).

TABLE 7

Arrangement of upper and lower coils in third embodiment

|  |  | Relative positions from a pole center | | | | | | |
|---|---|---|---|---|---|---|---|---|
|  |  | 1 | 2 | 3 | 4 | 5 | 6 | 7 |
| Parallel circuit 1 and 3 | Upper coil piece | 1 |  |  | 1 |  | 1 |  |
|  | Lower coil piece | 1 |  |  | 1 |  | 1 | 1 |
| Parallel circuit 2 and 4 | Upper coil piece |  | 1 | 1 |  | 1 |  | 1 |
|  | Lower coil piece |  | 1 | 1 |  | 1 |  |  |

|  |  | Relative positions from a pole center | | | | | | |
|---|---|---|---|---|---|---|---|---|
|  |  | 8 | 9 | 10 | 11 | 12 | 13 | 14 |
| Parallel circuit 1 and 3 | Upper coil piece | 1 | 1 |  | 1 |  |  | 1 |
|  | Lower coil piece |  | 1 |  |  | 1 |  | 1 |
| Parallel circuit 2 and 4 | Upper coil piece |  |  | 1 |  | 1 | 1 |  |
|  | Lower coil piece | 1 |  | 1 | 1 |  | 1 |  |

Therefore, the circuits of the upper coil pieces 15a in the first phase belt 17 are connected so that they are numbered 1, 2, 2, 1, 2, 1, 2, 1, 1, 2, 1, 2, 2 and 1 sequentially from a pole center Pa, and the circuits of the lower coil pieces 16a are connected so that they are numbered 1, 2, 2, 1, 2, 1, 1, 2, 1, 2, 2, 1, 2 and 1 sequentially from a pole center Pa. The circuits of the upper coil pieces 15b in the second phase belt 18 are numbered 3, 4, 4, 3, 4, 3, 4, 3, 3, 4, 3, 4, 4 and 3 sequentially from a pole center Pb, and the circuits of the lower coil pieces 16b are numbered 3, 4, 4, 3, 4, 3, 3, 4, 3, 4, 4, 3, 4, and 3 sequentially from a pole center Pb.

Table 8 shows the balance among the voltages generated in the armature winding according to the third embodiment of the invention.

The balance varies with a coil pitch in this embodiment. Table 8 shows the case that a coil pitch is 35/42 (83.33%). As shown in Table 8, in the armature winding according to the third embodiment of the invention, a voltage deviation (deviation from 1.0 of the p. u. voltage) is 0.01% maximum, and a phase angle deviation is 0.01°, which are higher than the values in the first and second embodiments, and satisfy the reference voltage deviation of 0.4% and reference phase angle deviation of 0.15° or lower in the Habermann patent.

TABLE 8

Voltage balance in third embodiment

|  | Parallel circuit | | | |
|---|---|---|---|---|
|  | 1 | 2 | 3 | 4 |
| Value of voltage (p.u.) | 0.9999 | 1.0001 | 0.9999 | 1.0001 |
| Phase of voltage (degrees) | 0.011 | −0.011 | 0.011 | −0.011 |

Table 9 shows the maximum values of voltage deviation and phase angle deviation changed by a coil pitch in the third embodiment of the invention. The balance within a practical coil pitch range is higher than the values in the first and second embodiments, and satisfies the reference voltage deviation of 0.4% and reference phase angle deviation of 0.15° or lower in the Habermann patent.

TABLE 9

Relationship between coil pitch and imbalance voltage in third embodiment

|  | Coil pitch | | | | | |
|---|---|---|---|---|---|---|
|  | 33/42 | 34/42 | 35/42 | 36/42 | 37/42 | 38/42 |
| Deviation in voltage value | 0.03% | 0.01% | 0.01% | 0.03% | 0.03% | 0.05% |
| Deviation in phase angle | 0.02° | 0.01° | 0.01° | 0.01° | 0.00° | 0.00° |

As described above, in the third embodiment of the invention, the balance higher than the reference values in the Payer patent can be realized with respect to the voltages in parallel circuits, and a circulating current can be decreased. Therefore, it is possible to provide a reliable armature winding by decreasing a temperature increase in an armature winding.

Further, in the third embodiment of the invention, as the jumper wires 20a and 20b are separately provided at the connection-side coil end 19a and counter-connection side coil end 19b, the distance between the jumper wires 20a and 20b is increased to larger than the values in the first end second embodiments. This improves the workability of connecting the jumper wires, and ensures the fixing strength without difficult, thereby providing a reliable armature winding.

Next, an example of modification of the third embodiment will be explained by referring to FIG. 4. Only the points different from FIG. 3 are described.

Figure 4:
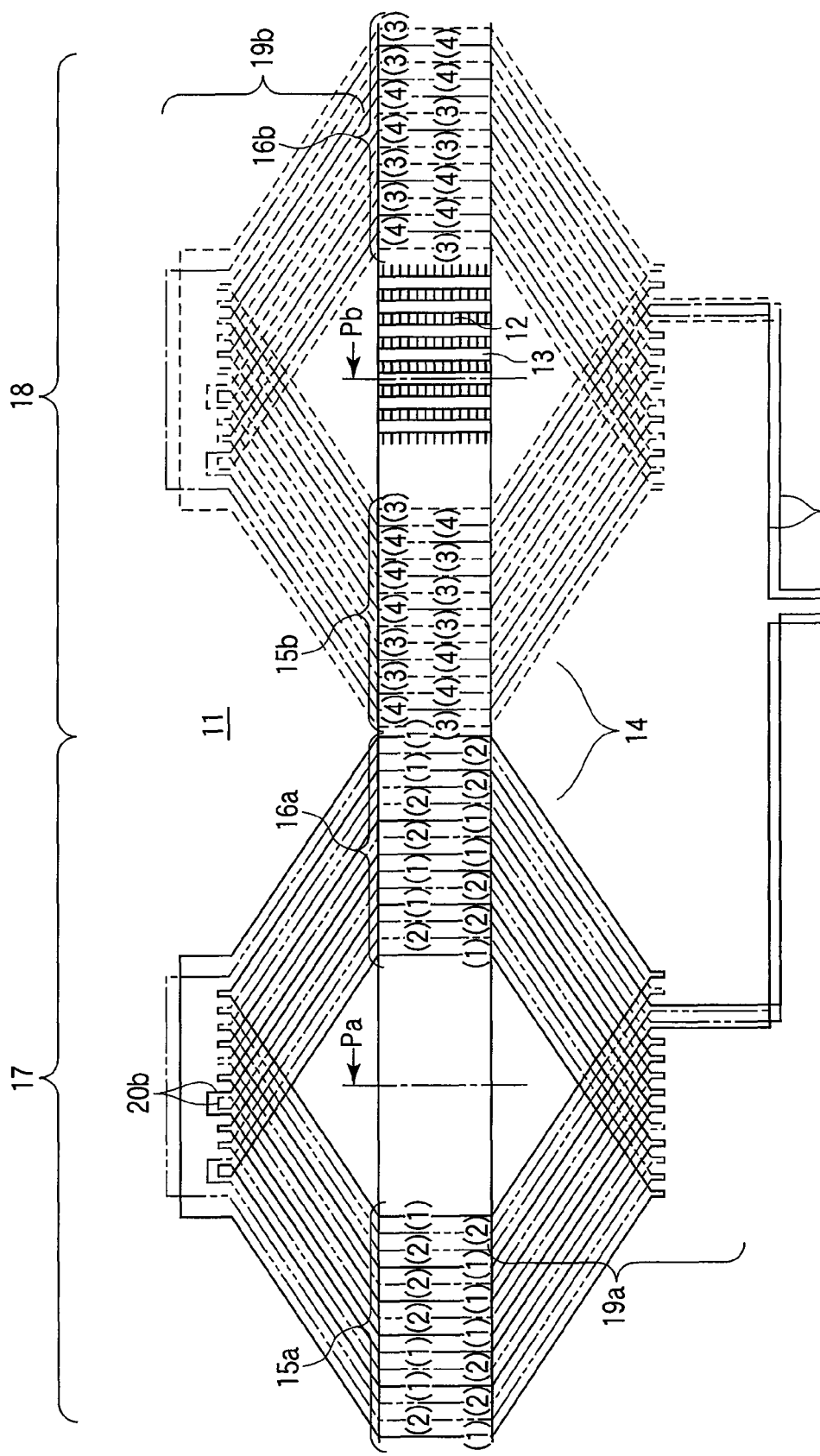
FIG. 4 is a developed perspective view of a modification of the armature winding of the rotating electrical machine according to the same embodiment.

In this modification, as shown in FIG. 4, by providing six jumper wires 20b per phase belt at the counter-connection side coil end 19b of each of the first and second phase belts 17 and 18, seven upper coil pieces 15 in each of the first and third parallel circuits are located at the 1st, 4th, 6th, 8th, 9th, 11th and 14th positions from a pole center Pa (Pb), and seven lower coil pieces 16 in each of the second and fourth parallel circuits are located at the 1st, 4th, 6th, 7th, 9th, 12th and 14th positions from a pole center Pa (Pb). Seven upper coil pieces 15 in each of the second and fourth parallel circuits are located at the 2nd, 3rd, 5th, 7th, 10th, 12th and 13th positions from a pole center Pa (Pb), and the lower coil pieces 16 are located at the 2nd, 3rd, 5th, 8th, 10th, 11th and 13th positions from a pole center Pa (Pb).

The arrangement of the coil pieces described above is the same as in the third embodiment of the invention, and an explanation of the electrical operation and effect is omitted here.

Further, in this modification, the length of two jumper wires per phase belt out of the jumper wires 20b is increased, but the total number six per phase is the same as in the third embodiment.

In the third embodiment described above, two jumper wires per phase belt out of the jumper wires 20b are provided at the connection-side coil end 19a, causing interference with the lead-out conductor 21, and the connection work becomes difficult. However, in this modification, the jumper wires 20b are provided only at the counter-connection side coil end 19b, causing no interference with the lead-out conductor 21. This improves the workability of connecting the jumper wires 20b, ensures the insulation and fixing strength of the connection part without difficulty, and provides a reliable armature winding.

Besides, in this modification, as the connection part of the lead-out conductor 21 can be arranged inside the first and second phase belts 17 and 18, not in a part adjacent to the first and second phase belts 17 and 18 and not-shown phase belts of other phases, a potential difference between the adjacent coil pieces of the connection part of the lead-out conductor 21 can be decreased, and reliability of insulation in the connection part of the lead-out conductor 21 can be increased.

Fourth Embodiment

Figure 5:
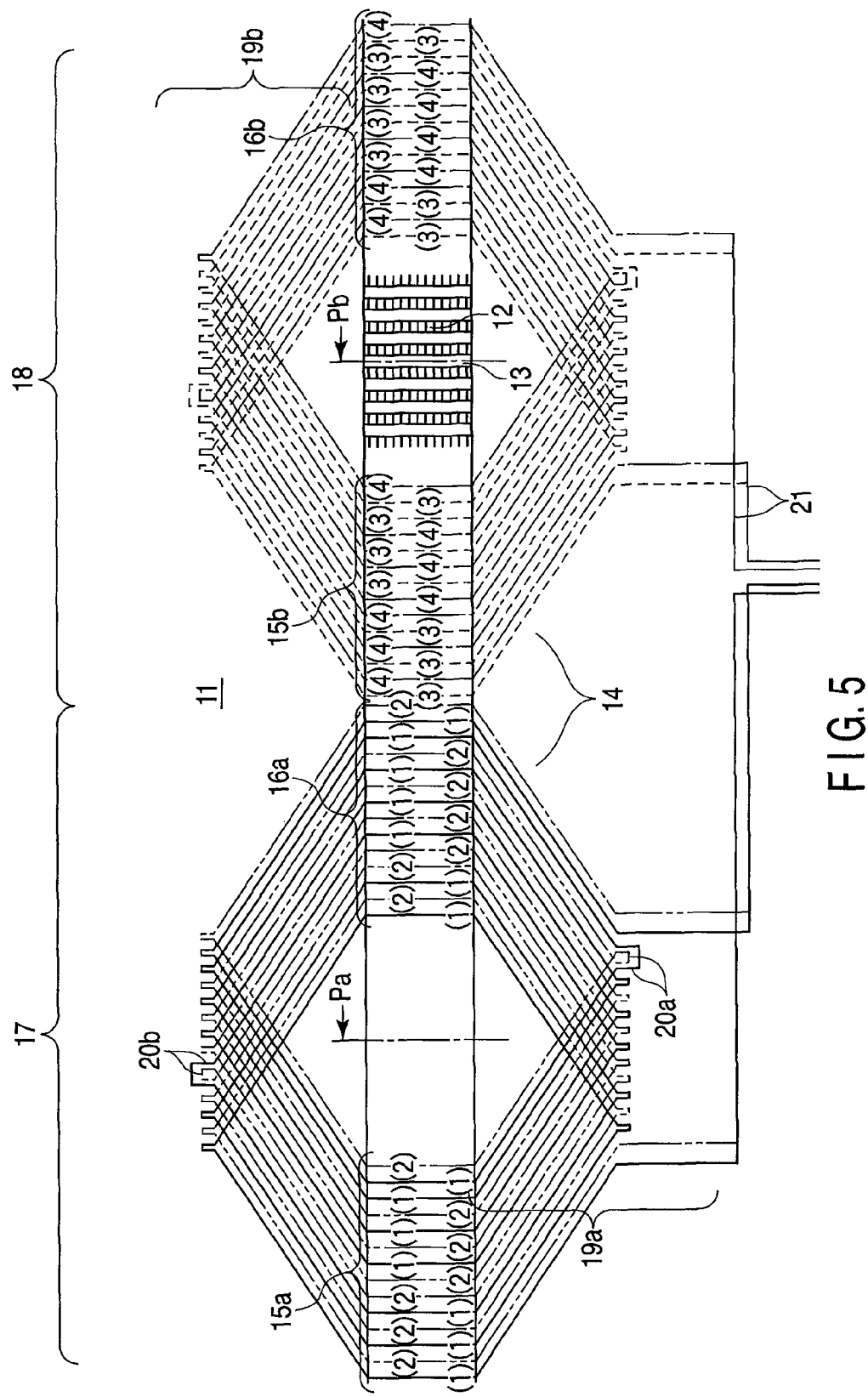
FIG. 5 is a developed perspective view showing one phase of an armature winding of a rotating electrical machine according to a fourth embodiment of the invention.

FIG. 5 is a developed perspective view showing one phase of an armature winding of a rotating electrical machine according to a fourth embodiment of the invention. An explanation of the same part of configuration as in FIG. 1 is omitted, and only a difference part of configuration is described.

In the fourth embodiment, as shown in FIG. 5, by providing the connection-side coil end 19a and counter-connection side coil end 19b of the first and second phase belts 17 and 18, when the relative positions of the upper and lower coil pieces 15 and 16 in the phase belts are indicated by the positions from a pole center Pa (Pb), the upper coil pieces 15 and lower coil pieces 16 of each parallel circuit are located at the positions shown in Table 10.

TABLE 10

Arrangement of upper and lower coils in fourth embodiment

| | | Relative positions from a pole center | | | | | | |
|---|---|---|---|---|---|---|---|---|
| | | 1 | 2 | 3 | 4 | 5 | 6 | 7 |
| Parallel circuit 1 and 3 | Upper coil piece | | 1 | 1 | | 1 | | 1 |
| | Lower coil piece | 1 | | 1 | | | 1 | |
| Parallel circuit 2 and 4 | Upper coil piece | 1 | | | 1 | | 1 | |
| | Lower coil piece | | 1 | | 1 | 1 | | 1 |

| | | Relative positions from a pole center | | | | | | |
|---|---|---|---|---|---|---|---|---|
| | | 8 | 9 | 10 | 11 | 12 | 13 | 14 |
| Parallel circuit 1 and 3 | Upper coil piece | | | 1 | | 1 | | 1 |
| | Lower coil piece | 1 | | 1 | | 1 | 1 | |
| Parallel circuit 2 and 4 | Upper coil piece | 1 | 1 | | 1 | | 1 | |
| | Lower coil piece | | 1 | | 1 | | | 1 |

Namely, seven upper coil pieces 15 in each of the first and third parallel circuits are located at the 2nd, 3rd, 5th, 7th, 10th, 12th and 14th positions from a pole center Pa (Pb), and the lower coil pieces 16 are located at the 1st, 3rd, 6th, 8th, 10th, 12th and 13th positions from a pole center. Seven upper coil pieces 15 in each of the second and fourth parallel circuits are located at the 1st, 4th, 6th, 8th, 9th, 11th and 13th positions from a pole center Pa (Pb), and the lower coil pieces 16 are located at the 2nd, 4th, 5th, 7th, 9th, 11th and 14th positions from a pole center Pa (Pb).

Therefore, the circuits of the upper coil pieces 15a in the first phase belt 17 are connected so that they are numbered 2, 1, 1, 2, 1, 2, 1, 2, 2, 1, 2, 1, 2 and 1 sequentially from a pole center Pa, and the circuits of the lower coil pieces 16a are connected so that they are numbered 1, 2, 1, 2, 2, 1, 2, 1, 2, 1, 2, 1, 1 and 2 sequentially from a pole center Pa. The circuits of the upper coil pieces 15b in the second phase belt 18 are numbered 4, 3, 3, 4, 3, 4, 3, 4, 4, 3, 4, 3, 4 and 3 sequentially from a pole center Pb, and the circuits of the lower coil pieces 16b are numbered 3, 4, 3, 4, 4, 3, 4, 3, 4, 3, 4, 3, 3 and 4 sequentially from a pole center Pb.

Table 11 shows the balance among the voltages generated in the armature winding according to the third embodiment of the invention.

The balance varies with a coil pitch in this embodiment. Table 11 shows the case that a coil pitch is 35/42 (83.33%). As shown in Table 11, in the armature winding according to the fourth embodiment of the invention, a voltage deviation (deviation from 1.0 of the p. u. voltage) is 0.26% maximum, and a phase angle deviation is 0.05°, which are lower than the values in the first to third embodiments, but satisfy the reference voltage deviation of 0.4% and reference phase angle deviation of 0.15° or lower in the Habermann patent.

TABLE 11

Voltage balance in fourth embodiment

| | Parallel circuit | | | |
|---|---|---|---|---|
| | 1 | 2 | 3 | 4 |
| Value of voltage (p.u.) | 0.9974 | 1.0026 | 0.9974 | 1.0026 |
| Phase of voltage (degrees) | 0.047 | −0.047 | 0.047 | −0.047 |

Table 12 shows the maximum values of voltage deviation and phase angle deviation changed by a coil pitch in the fourth embodiment of the invention. The balance within a practical coil pitch range is lower than the values in the first to third embodiments, but satisfies the reference voltage deviation of 0.4% and reference phase angle deviation of 0.15° or lower in the Habermann patent.

TABLE 12

Relationship between coil pitch and imbalance voltage in fourth embodiment

| | Coil pitch | | | | | |
|---|---|---|---|---|---|---|
| | 33/42 | 34/42 | 35/42 | 36/42 | 37/42 | 38/42 |
| Deviation in voltage value | 0.22% | 0.24% | 0.26% | 0.29% | 0.31% | 0.33% |
| Deviation in phase angle | 0.04° | 0.05° | 0.05° | 0.05° | 0.05° | 0.05° |

As described above, in the fourth embodiment of the invention, the balance satisfying the reference value in the Harbermann patent can be realized for the voltages in each parallel circuit, and a circulating current can be decreased.

Further, in the fourth embodiment of the invention, the number of the jumper wires 20a and 20b is decreased to four wires per phase, compared in the first to third embodiments, and the jumper wires 20a and 20b are separately provided at the connection-side coil end 19a and counter-connection side coil end 19b, increasing the distance between the jumper wires 20a and 20b. This improves the workability of connecting the jumper wires, and ensures the fixing strength without difficult, thereby providing a reliable armature winding. Besides, as the number of the jumper wires is decreased, the number of man-hours required for providing jumper wires is of course decreased.

Next, an example of modification of the fourth embodiment will be explained by referring to FIG. 6. Only the points different from FIG. 5 are described.

Figure 6:
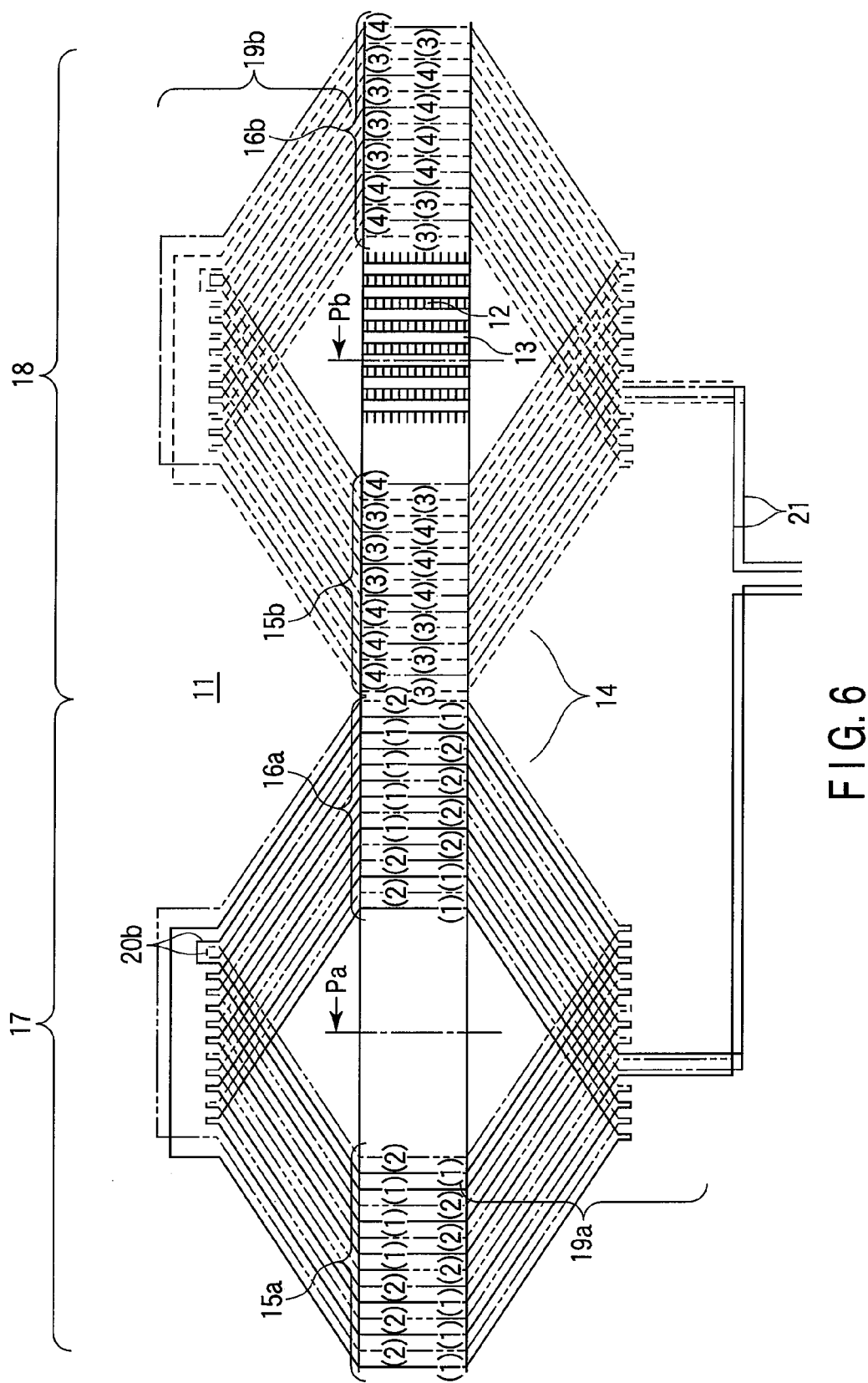
FIG. 6 is a developed perspective view of a modification of the armature winding of the rotating electrical machine according to the same embodiment.
Figure 7:
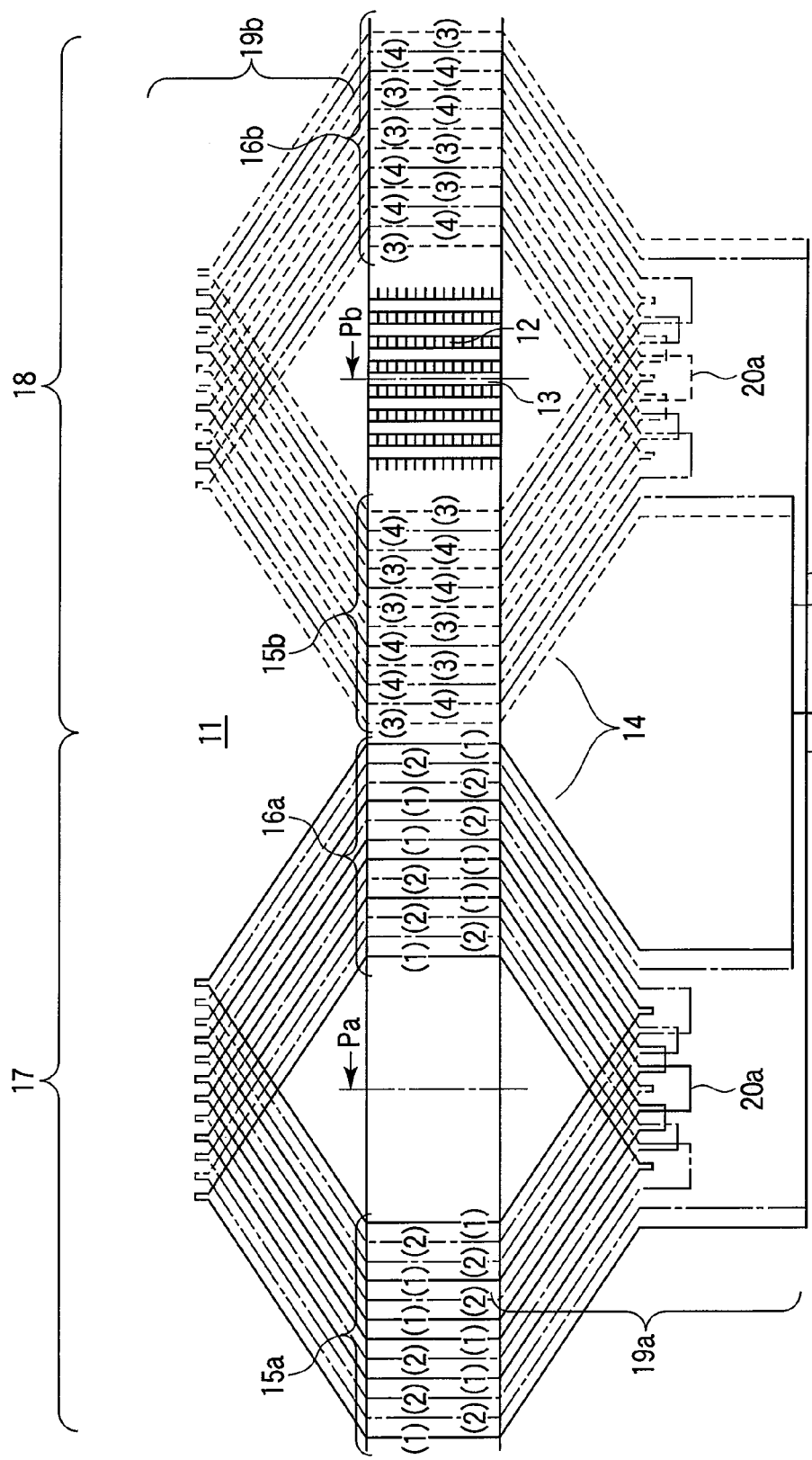
FIG. 7 is a developed perspective view of an example of a conventional armature winding of a rotating electrical machine.

In this modification, as shown in FIG. 6, by providing four jumper wires 20b per phase belt at the counter-connection side coil end 19b of each of the first and second phase belts 17 and 18, when the relative positions of the upper and lower coil pieces 15 and 16 in the phase belts are indicated by the positions from a pole center Pa (Pb), the upper coil pieces 15 and lower coil pieces 16 of each parallel circuit 1, 2, 3 and 4 are located at the positions shown in Table 10.

The arrangement of the coil pieces described above is the same as in the fourth embodiment of the invention, and an explanation of the electrical operation and effect is omitted here.

In this configuration, the length of two per phase out of the jumper wires 20b is increased, but the total number six per phase is the same as in the third embodiment. In the fourth embodiment, two jumper wires per phase belt out of the jumper wires 20b are provided at the connection-side coil end 19a, causing interference with the lead-out conductor 21, and the connection work becomes difficult. However, in this modification, the jumper wires 20b are provided only at the counter-connection side coil end 19b, causing no interference with the lead-out conductor 21. This improves the workability of connecting the jumper wires 20b, ensures the insulation and fixing strength of the connection part without difficulty, and provides a reliable armature winding.

Further, as the number of the jumper wires is decreased, the number of man-hours required for providing jumper wires is of course decreased.

Besides, in this modification, as the connection part of the lead-out conductor 21 can be arranged inside the first and second phase belts 17 and 18, not in a part adjacent to the first and second phase belts 17 and 18 and not-shown phase belts of other phases, a potential difference between the adjacent coil pieces of the connection part of the lead-out conductor 21, and reliability of insulation in the connection part of the lead-out conductor 21 can be increased.

As described in detail herein, according to the embodiments of the present invention, it is possible to provide an armature having an armature winding with four parallel circuits, applied to a rotating electrical machine having 84 three-phase two-pole slots, in which a voltage imbalance among parallel circuits is decreased, and a circulating current loss among parallel circuits is decreased, and a jumper wire connection work in forming an armature winding is decreased, insulation and fixing strength of jumper wires are easily ensured.

What is claimed is:

1. An armature comprising:
an armature core with slots; and
an armature winding that is housed in the slots, wound in two layers, and provided with fourteen coil pieces per pole and phase, each phase of the armature winding divided into two phase belts, one phase belt per pole, each phase belt having two parallel circuits, each parallel circuit having a serial coil, each serial coil having upper coil pieces and lower coil pieces connected to each other at a connection-side coil end and a counter-connection side coil end,
the upper and lower coil pieces in one half of the parallel circuits being located at the 1st, 4th, 6th, 7th, 9th, 12th and 14th positions, and the upper and lower coil pieces in remaining half of the parallel circuits being located at the 2nd, 3rd, 5th, 8th, 10th, 11th and 13th positions, when relative positions of the upper and lower coil pieces in each phase belt are indicated by positions counted in a direction separating away from a pole center.

2. The armature according to claim 1, wherein:
the armature winding is a two-pole three-phase armature winding, each phase having four parallel circuits, divided into two phase belts, and housed in 84 slots;
the parallel circuits corresponding to the upper and lower coil pieces in the first phase belt are numbered 1, 2, 2, 1, 2, 1, 1, 2, 1, 2, 2, 1, 2 and 1, in a direction separating away from a pole center; and
the parallel circuits corresponding to the upper and lower coil pieces in the second phase belt are numbered 3, 4, 4, 3, 4, 3, 3, 4, 3, 4, 4, 3, 4 and 3, in a direction separating away from a pole center.

3. An armature comprising:
an armature core with slots; and
an armature winding that is housed in the slots, wound in two layers, and provided with fourteen coil pieces per pole and phase, each phase of the armature winding divided into two phase belts, one phase belt per pole, each phase belt having two parallel circuits, each parallel circuit having a serial coil, each serial coil having upper coil pieces and lower coil pieces connected to each other at a connection-side coil end and a counter-connection side coil end,
the upper coil pieces in one half of the parallel circuits being located at the 1st, 4th, 6th, 8th, 9th, 11th and 14th positions, the lower coil pieces in the one half of the parallel circuits being located at the 2nd, 4th, 5th, 7th, 9th, 12th and 14th positions, and the upper coil pieces in remaining half of the parallel circuits being located at the 2nd, 3rd, 5th, 7th, 10th, 12th, and 13th positions, and the lower coil pieces in the remaining half of the parallel circuits being located at the 1st, 3rd, 6th, 8th, 10th, 11th and 13th positions, when relative positions of the upper and lower coil pieces in each phase belt are indicated by positions counted in a direction separating away from a pole center.

4. The armature according to claim 3, wherein:
the armature winding is a two-pole three-phase armature winding, each phase having four parallel circuits, divided into two phase belts, and housed in 84 slots;
the parallel circuits corresponding to the upper coil pieces in the first phase belt are numbered 1, 2, 2, 1, 2, 1, 2, 1, 1, 2, 1, 2, 2 and 1, and the parallel circuits corresponding to the lower coil pieces in the first phase belt are numbered 2, 1, 2, 1, 1, 2, 1, 2, 1, 2, 2, 1, 2 and 1, in a direction separating away from a pole center; and
the parallel circuits corresponding to the upper and lower coil pieces in the second phase belt are numbered 3, 4, 4, 3, 4, 3, 4, 3, 3, 4, 3, 4, 4 and 3, and the parallel circuits corresponding to the upper coil pieces in the second phase belt are numbered 3, 4, 4, 3, 4, 3, 4, 3, 3, 4, 3, 4, 4 and 3, in a direction separating away from a pole center.

5. An armature comprising:

an armature core with slots; and an armature winding that is housed in the slots, wound in two layers, and provided with fourteen coil pieces per pole and phase, each phase of the armature winding divided into two phase belts, one phase belt per pole, each phase belt having two parallel circuits, each parallel circuit having a serial coil, each serial coil having upper coil pieces and lower coil pieces connected to each other at a connection-side coil end and a counter-connection side coil end, the upper coil pieces in one half of the parallel circuits being located at the 1st, 4th, 6th, 8th, 9th, 11th and 14th positions, the lower coil pieces in the one half of the parallel circuits being located at the 1st, 4th, 6th, 7th, 9th, 12th and 14th positions, and the upper coil pieces in remaining half of the parallel circuits being located at the 2nd, 3rd, 5th, 7th, 10th, 12th and 13th positions, and the lower coil pieces in the remaining half of the parallel circuits being located at the 2nd, 3rd, 5th, 8th, 10th, 11th and 13th positions, when relative positions of the upper and lower coil pieces in each phase belt are indicated by positions counted in a direction separating away from a pole center.

6. The armature according to claim 5, wherein:

the armature winding is a two-pole three-phase armature winding, each phase having four parallel circuits, divided into two phase belts, and housed in 84 slots;

the parallel circuits corresponding to the upper coil pieces in the first phase belt are numbered 1, 2, 2, 1, 2, 1, 2, 1, 1, 2, 1, 2, 2 and 1, and the parallel circuits corresponding to the lower coil pieces in the first phase belt are numbered 1, 2, 2, 1, 2, 1, 1, 2, 1, 2, 2, 1, 2 and 1, in a direction separating away from a pole center; and the parallel circuits corresponding to the upper coil pieces in the second phase belt are numbered 3, 4, 4, 3, 4, 3, 4, 3, 3, 4, 3, 4, 4 and 3, and the parallel circuits corresponding to the lower coil pieces in the second phase belt are numbered 3, 4, 4, 3, 4, 3, 3, 4, 3, 4, 4, 3, 4 and 3, in a direction separating away from a pole center.

7. The armature according to claim 5, wherein two jumper wires per phase belt, which connect upper coil pieces and lower coil pieces, are provided at the counter-connection coil end, and four jumper wires per phase belt, which connect upper coil pieces and lower coil pieces, are provided at the connection-side coil end.

8. The armature according to claim 5, wherein six jumper wires per phase belt, which connect upper coil pieces and lower coil pieces, are provided at the counter-connection coil end.

9. An armature comprising:

an armature core with slots; and an armature winding that is housed in the slots, wound in two layers, and provided with fourteen coil pieces per pole and phase, each phase of the armature winding divided into two phase belts, one phase belt per pole, each phase belt having two parallel circuits, each parallel circuit having a serial coil, each serial coil having upper coil pieces and lower coil pieces connected to each other at a connection-side coil end and a counter-connection side coil end, the upper coil pieces in one half of the parallel circuits being located at the 2nd, 3rd, 5th, 7th, 10th, 12th and 14th positions, the lower coil pieces in the one half of the parallel circuits being located at the 1st, 3rd, 6th, 8th, 10th, 12th and 13th positions, and the upper coil pieces in remaining half of the parallel circuits being located at the 1st, 4th, 6th, 8th, 9th, 11th and 13th positions, and the lower coil pieces in the remaining half of the parallel circuits being located at the 2nd, 4th, 5th, 7th, 9th, 11th and 14th positions, when relative positions of the upper and lower coil pieces in each phase belt are indicated by positions counted in a direction separating away from a pole center.

10. The armature according to claim 9, wherein:

the armature winding is a two-pole three-phase armature winding, each phase having four parallel circuits, divided into two phase belts, and housed in 84 slots;

the parallel circuits corresponding to the upper coil pieces in the first phase belt are numbered 2, 1, 1, 2, 1, 2, 1, 2, 2, 1, 2, 1, 2 and 1, and the parallel circuits corresponding to the lower coil pieces in the first phase belt are numbered 1, 2, 1, 2, 2, 1, 2, 1, 2, 1, 2, 1, 1 and 2, in a direction separating away from a pole center; and the parallel circuits corresponding to the upper coil pieces in the second phase belt are numbered 4, 3, 3, 4, 3, 4, 3, 4, 4, 3, 4, 3, 4 and 3, and the parallel circuits corresponding to the lower coil pieces in the second phase belt are numbered 3, 4, 3, 4, 4, 3, 4, 3, 4, 3, 4, 3, 3 and 4, in a direction separating away from a pole center.

11. The armature according to claim 9, wherein two jumper wires per phase belt, which connect upper coil pieces and lower coil pieces, are provided at the counter-connection, coil end, and two jumper wires per phase belt, which connect upper coil pieces and lower coil pieces, are provided at the connection-side coil end.

12. The armature according to claim 9, wherein four jumper wires per phase belt, which connect upper coil pieces and lower coil pieces, are provided at the counter-connection coil end.

13. A rotating electrical machine having the armature according to any one of claims 3 to 12.

14. A rotating electrical machine having the armature according to claim 1.

* * * * *

UNITED STATES PATENT AND TRADEMARK OFFICE
CERTIFICATE OF CORRECTION

PATENT NO. : 8,008,829 B2
APPLICATION NO. : 12/362090
DATED : August 30, 2011
INVENTOR(S) : T. Tokumasu et al.

It is certified that error appears in the above-identified patent and that said Letters Patent is hereby corrected as shown below:

| COLUMN | LINE | ERROR |
|---|---|---|
| 14 (Claim 4, line 11) | 62 | Delete "and lower" |
| 16 (Claim 11, line 3) | 41 | After "counter-connection" delete ";" |

Signed and Sealed this
Twentieth Day of March, 2012

David J. Kappos
*Director of the United States Patent and Trademark Office*